United States Patent
Moriconi et al.

(10) Patent No.: US 6,590,547 B2
(45) Date of Patent: *Jul. 8, 2003

(54) REMOVABLE COMPUTER DISPLAY INTERFACE

(75) Inventors: David P. Moriconi, Ben Lomond, CA (US); Dan Kikinis, Saratoga, CA (US)

(73) Assignee: Elonex IP Holdings Ltd., London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 09/974,464

(22) Filed: Oct. 9, 2001

(65) Prior Publication Data

US 2002/0057264 A1 May 16, 2002

Related U.S. Application Data

(60) Continuation of application No. 08/968,384, filed on Nov. 12, 1997, now Pat. No. 6,300,921, which is a continuation of application No. 08/562,835, filed on Nov. 27, 1995, now abandoned, which is a division of application No. 08/097,768, filed on Jul. 26, 1993, now Pat. No. 5,546,098, which is a division of application No. 07/918,966, filed on Jul. 27, 1992, now Pat. No. 5,262,759.

(51) Int. Cl.$^7$ ................................................. G09G 3/00
(52) U.S. Cl. ...................... 345/30; 345/1.1; 345/905; 361/681; 361/684; 248/917
(58) Field of Search ................................ 345/173–183, 345/901, 169, 1.1, 905, 30; 361/681–683, 729, 730; 248/917–923; 439/296, 326, 926, 261, 31

(56) References Cited

U.S. PATENT DOCUMENTS

| 4,497,036 A | * | 1/1985 | Dunn ........................ 364/708 |
| 4,672,501 A | | 6/1987 | Bilac et al. .................... 361/96 |
| 4,788,658 A | * | 11/1988 | Hanebuth ................... 364/708 |
| 4,794,381 A | | 12/1988 | Iwai ............................ 345/112 |
| 4,870,531 A | | 9/1989 | Danek ........................ 340/711 |
| 4,939,652 A | | 7/1990 | Steiner ........................ 340/438 |
| 4,980,678 A | | 12/1990 | Zenda ......................... 340/805 |
| 5,126,725 A | | 6/1992 | Yanagisawa .............. 364/708.1 |
| 5,138,305 A | | 8/1992 | Tomiyasu .................... 345/213 |
| 5,138,565 A | | 8/1992 | Satou .......................... 364/708 |
| 5,144,290 A | * | 9/1992 | Honda et al. ................ 340/711 |
| 5,166,893 A | | 11/1992 | Hosoi .......................... 364/708 |
| 5,237,488 A | * | 8/1993 | Moser et al. ................ 361/729 |
| 5,262,759 A | | 11/1993 | Moriconi et al. |
| 5,264,992 A | | 11/1993 | Hogdahl et al. ......... 364/708.1 |
| 5,276,458 A | | 1/1994 | Sawdon ...................... 345/132 |
| 5,319,582 A | * | 6/1994 | Ma .............................. 345/169 |
| 5,347,630 A | * | 9/1994 | Ishizawa et al. ............ 345/203 |
| 5,546,098 A | | 8/1996 | Moriconi et al. |

FOREIGN PATENT DOCUMENTS

| EP | 0 456 923 | 11/1991 |
| JP | 60-154396 | 8/1985 |
| JP | 2-77088 | 3/1990 |
| JP | 3-226792 | 10/1991 |

OTHER PUBLICATIONS

U.S. patent application Ser. No. 08/968,384, Moriconi et al.
IBM Technical Bulletin "Improvements to Display Identification" Nov. 1990 p. 83–85 vol. 33 No. 6B.
IBM Technical Bulletin "Self–Identification Protocol Initialization" Mar. 1991 p. 406–407 vol. 33 No. 10A.

* cited by examiner

*Primary Examiner*—Lun-Yi Lao
(74) *Attorney, Agent, or Firm*—Woodcock Washburn LLP

(57) ABSTRACT

A portable computer is configured to accept removable modular display panels of different types that plug into a structure hinged to the body of the computer. Each display panel has a sliding engagement means fixed along a lower edge, and the hinged structure has a mating sliding engagement means along an upper edge and parallel to the axis of the hinge, allowing a display panel to engage and disengage in the direction of the axis of the hinge. In an embodiment of the invention, display modules adaptable to the computer have a code stored in a memory device that is accessible on start-up by the computer, to identify and load a display driver routine capable of driving the display module assembled to the computer.

20 Claims, 7 Drawing Sheets

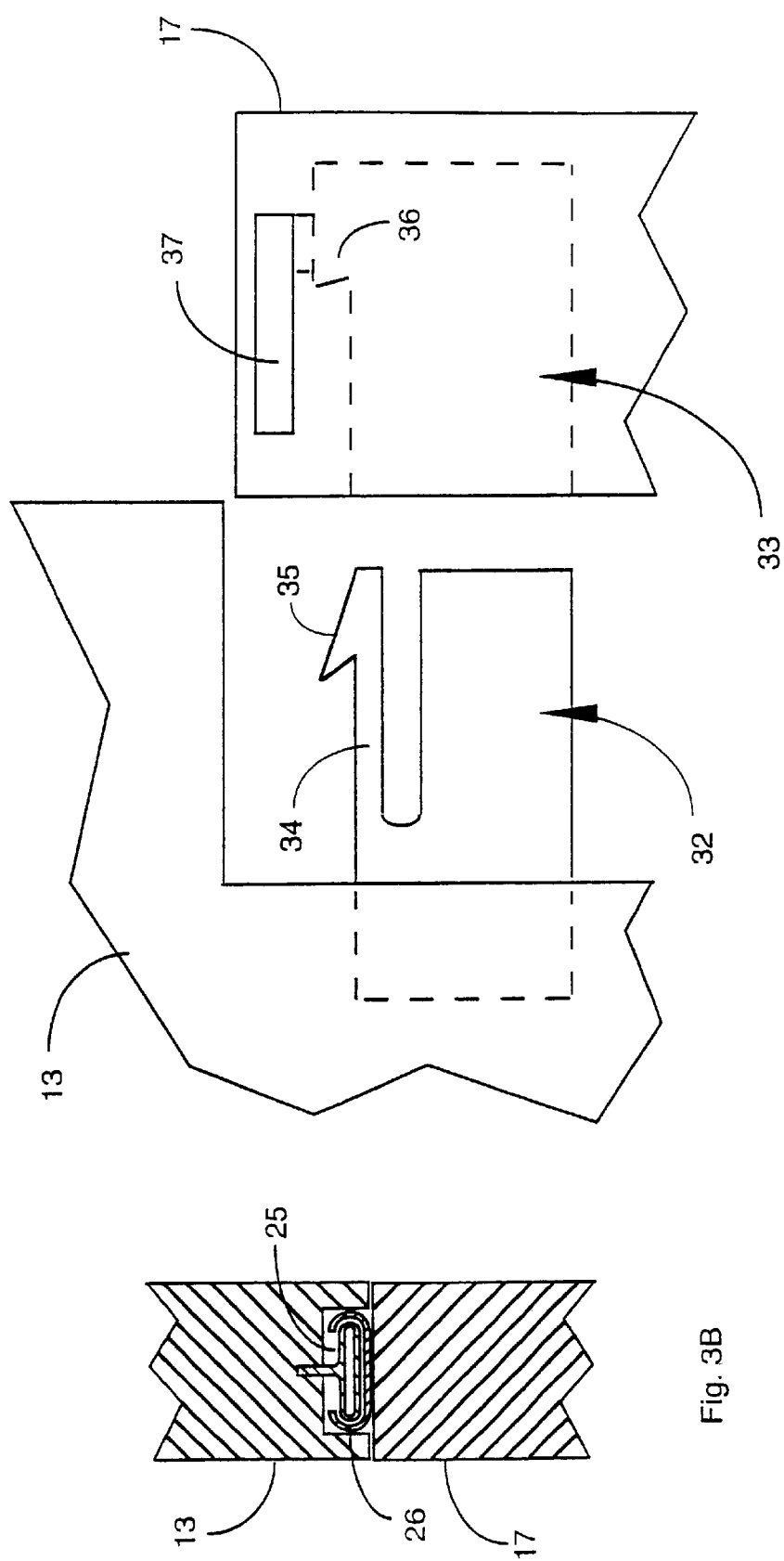

REMOVABLE COMPUTER DISPLAY INTERFACE

CROSS REFERENCE TO RELATED DOCUMENTS

This application is a continuation of Ser. No. 08/968,384 filed Nov. 12, 1997 now U.S. Pat. No. 6,300,921 which is a continuation of Ser. No. 08/562,835 filed Nov. 27, 1995 now abandoned, which is a divisional of Ser. No. 08/097,768, Jul. 26, 1993 now U.S. Pat. No. 5,546,098 which is a divisional of Ser. No. 07/918,966 filed Jul. 27, 1992 now U.S. Pat. No. 5,262,759, and disclosed on May 12, 1992 in Document Disclosure #309810.

FIELD OF THE INVENTION

This invention is in the field of architecture of portable computers, and pertains in particular to apparatus and methods of interfacing removable physical displays to portable computers.

BACKGROUND OF THE INVENTION

The marketplace for portable computers, such as notebook and laptop computers, is one of the faster growing sectors of the computer industry. There are many challenges in developing and designing computers of this sort, many of which are a result of need for light weight, strength, and longevity of portable power sources.

Another area of innovation in the development of portable computers is driven by the facts of use of portable computers as compared to stationary models. Portable computers have to operate under a variety of conditions. For example, while a stationary model, such as a desktop computer, is typically used at a single location under relatively constant lighting conditions, a portable computer must be usable under a variety of lighting conditions in both indoor and outdoor situations. In some situations it is even preferable to have a display that is usable in bright sunlight.

There are several different types of computer displays, and many new types being developed, all of which are what are called in the art "flat panel" displays. Flat panel displays are necessary, because the well-known CRT displays are much too bulky and vulnerable to be used extensively for portable applications.

Among the many different types are Transflective displays, which have low back light and low power consumption; standard monochrome paper-white displays, which are back-lit and exhibit moderate power consumption; and passive color displays, also known as super-twist nematic (STN), which have very good visibility and color, but exhibit higher power consumption.

There are seen to be, then, many issues one must consider when choosing a display, such as visibility under different ambient conditions, color availability and range, power consumption, and more. And in the current state-of-the-art, choosing the display is akin to choosing the computer, because most computers are not provided with a range of choices in display.

What is clearly needed is a portable computer with a physical interface for attaching and detaching a display panel, and a means of recognizing on power-up the specific display attached.

SUMMARY OF THE INVENTION

In a preferred embodiment of the invention a computer system is provided having a body structure that houses and supports computing elements, memory elements and input elements. The display for the system is provided as a removable flat panel display module which has physical and electrical joining elements for attaching to the body structure of the computer. The attachment is made to a mounting structure that is hinged to the body structure along a pivot axis, and the mounting structure has corresponding physical and electrical joining elements to engage those provided on the display module. The physical and electrical joining elements are aligned to join and disjoin by motion in the direction of the pivot axis, which provides for secure attachment in the event a user lifts the computer by the display module.

In a preferred embodiment the physical mating elements comprise engaging rails with an engaging direction parallel to the pivot axis of the mounting structure, and a snap-in structure having a matching slot and a disengagement pushbutton comprising a releasable detent mechanism. The electrical connection is made in this preferred embodiment by a multi-pin connector engaging and disengaging in the same direction as the engagement rails.

Also in a preferred embodiment, modular displays for use with a computer configured to accept them have a code stored in a memory device, such as an EEPROM, for identifying the type of display, which is accessed by the computer memory and matched with a compatible display driver routine for operating the display, which the computer then uses. Newly developed displays may then be used with computers previously manufactured and sold, by updating the computer BIOS and providing suitable drive routines for such newly developed displays.

BRIEF DESCRIPTION OF THE DRAWINGS

FIG. 3B is a cross-section view through guide and engaging taken along section line 3B—3B of FIG. 2.

FIG. 3C is an elevation view of a latching mechanism employed in an embodiment of the invention.

DESCRIPTION OF THE PREFERRED EMBODIMENTS

Figure 1:
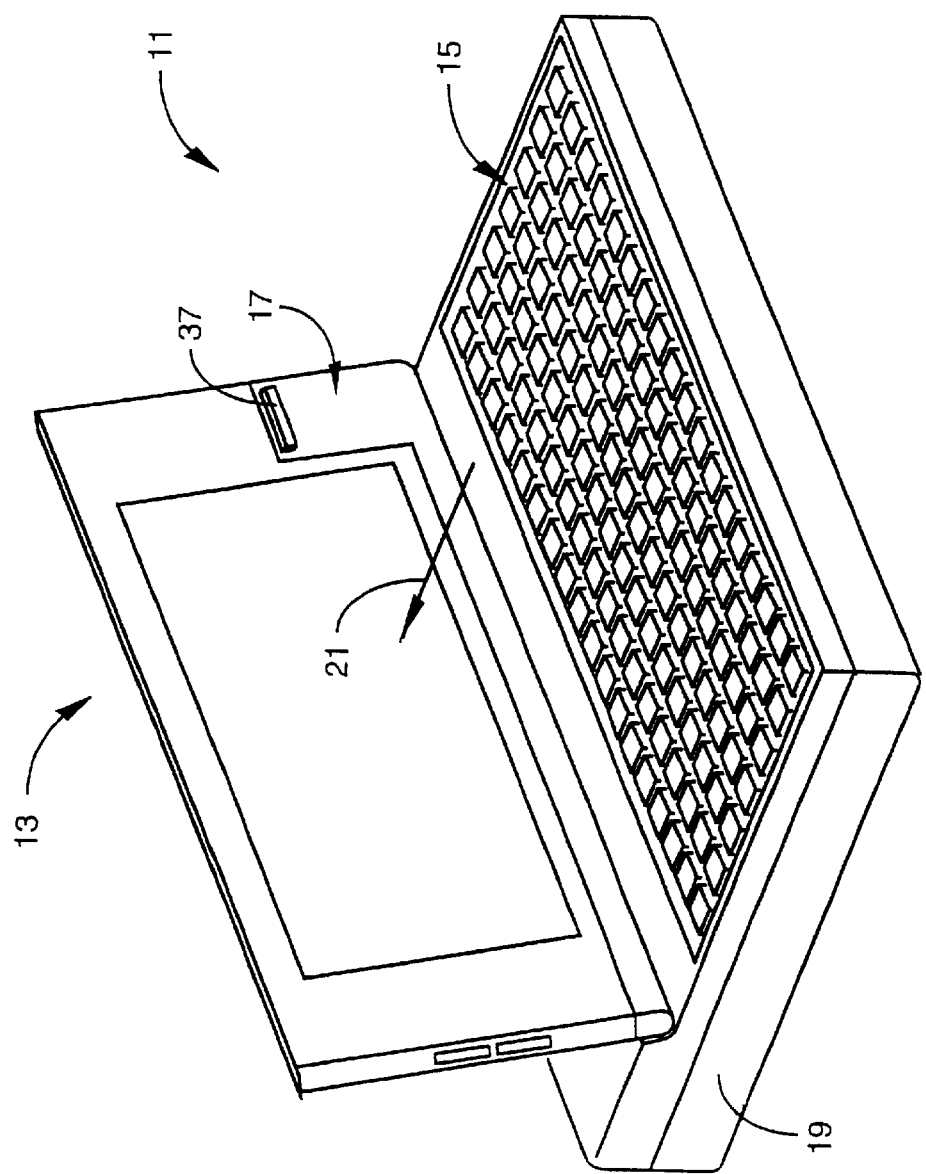
FIG. 1 is an isometric view of a portable computer according to the invention with a removable modular display.

FIG. 1 is an isometric view of a notebook computer 11 with a removable, interchangeable display module 13 according to an embodiment of the present invention, allowing a variety of different types of display modules to be used with the same computer apparatus simply by removing one display module and substituting another. Notebook 11 also comprises a keyboard 15 and a body portion 19. Display module 13 is shown in the "open" position, but may be rotated "closed" over the keyboard, where it may be secured by conventional latching mechanisms.

In the embodiment shown in FIG. 1, display module 13 is configured to attach to a hinged mounting structure 17, having an "L" shape, which remains with the computer when display module 13 is removed. The hinges between body portion 19 and mounting structure 17 are not seen in FIG. 1, and may be accomplished in a number of conventional ways. In a preferred embodiment, the hinge mechanisms are pre-loaded to provide sufficient friction to allow the display, if released at any partially open position, to remain in that position.

Figure 2:
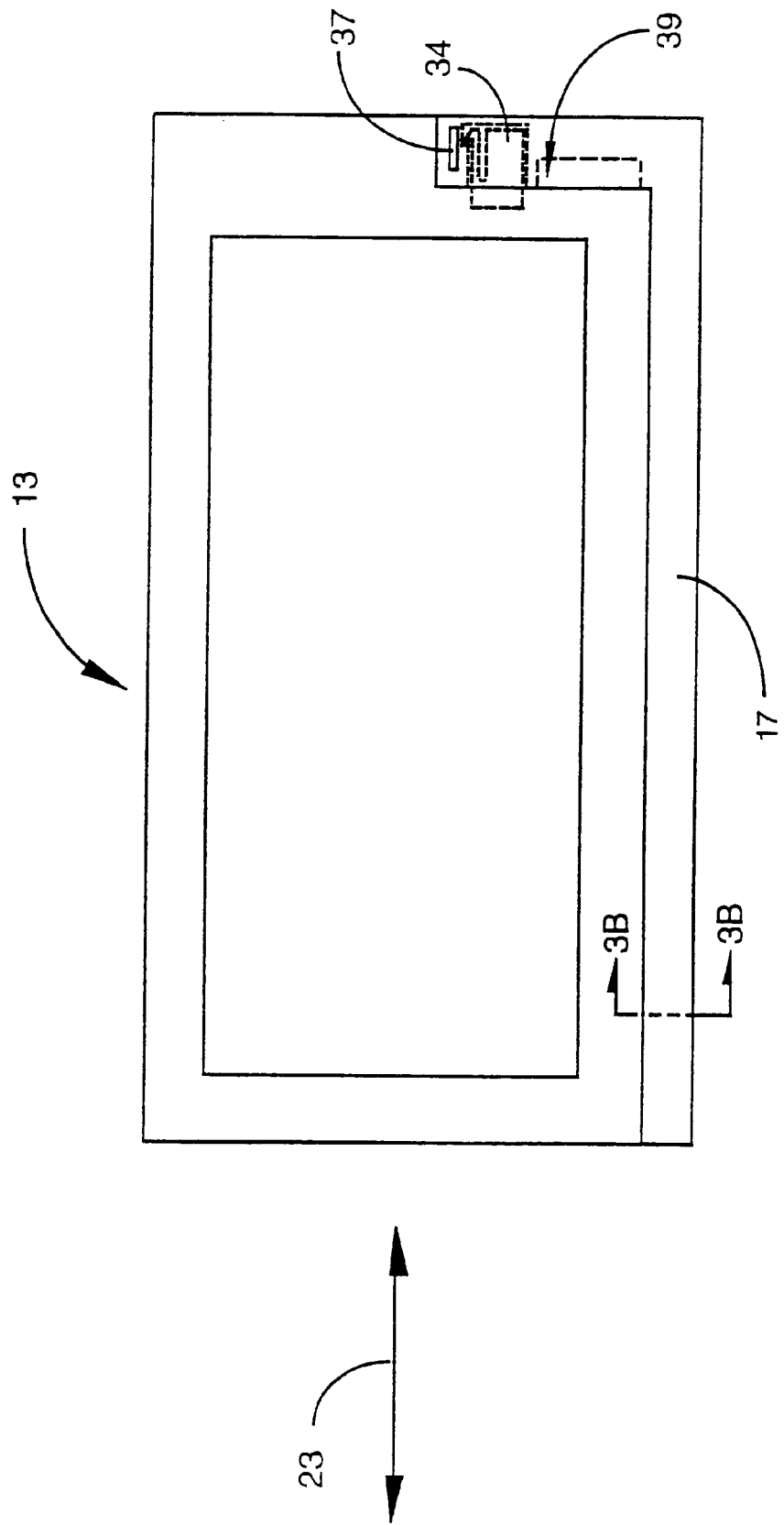
FIG. 2 is an elevation view of a modular display according to an embodiment of the invention, assembled to a mounting structure.

FIG. 2 is a face-on view of the notebook computer in the direction of arrow 21 of FIG. 1, showing more detail of the unique mounting of display module 13 to mounting structure 17 according to the present embodiment of the invention. The unique mounting configuration provides for display module 13 to approach and engage mounting structure 17 from one side, in this case from the left, and to be removed also from the side, in the direction of arrow 23. FIG. 2A shows the display module fully engaged.

Figure 3A:
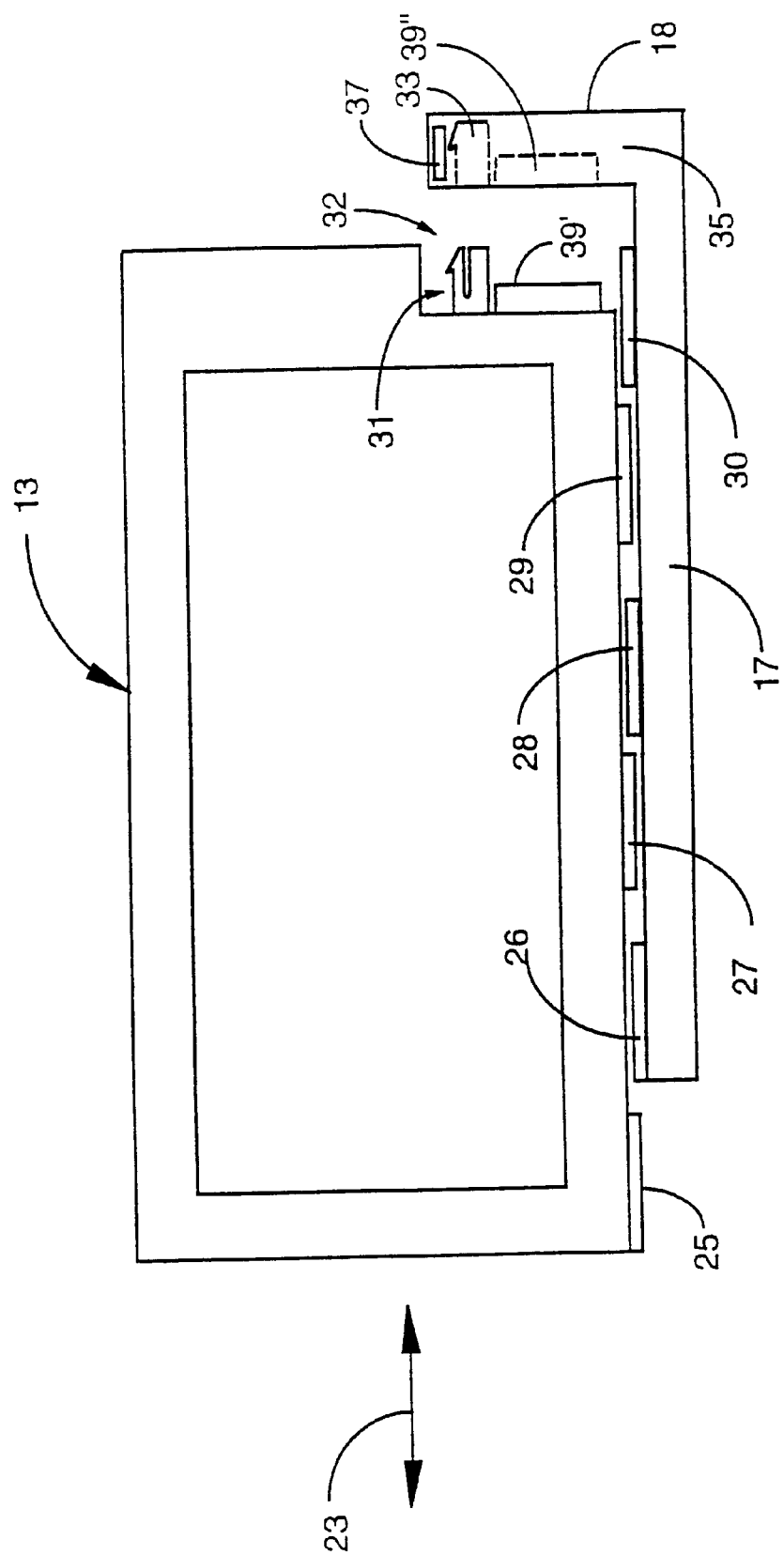
FIG. 3A is a view of the same components as shown in FIG. 2, but with the modular display disjoined from the mounting structure.

FIG. 3A is a view of the notebook computer from the same vantage as in FIG. 2, but showing the display module fully disengaged from mounting structure 17. In this embodiment there are three sets of linearly engaging guides for guiding the display module into engagement, and for providing structural rigidity when engaged. Guides 25 and 26 are one set, guides 27 and 28 another set, and guides 29 and 30 a third set. Three sets have been found to be convenient. There could be one, two, or more than three sets of guides in other embodiments.

FIG. 3B is a section taken through the engaging guide set comprising guides 25 and 26 to better illustrate the details of engagement. In this embodiment guide 25 has a T-shape, and guide 26 has a C-shape, such that the T-shape of guide 25 fits snugly within the C-shape of guide 26. The engaging shapes of the other guide sets follow the same detail as the set shown.

Although not shown in the Figs. provided, the leading end of T-shaped guides are tapered for easy entry into the C-shaped guides. Also, there is no necessity for one sort to be attached to the display module and the other to the mounting structure.

Mounting structure 17 has a vertical portion 18 at one end, and display module 13 has a cut-out area 31 of the same shape and size as vertical portion 18, so when the display module is fully engaged with mounting structure 17 the two form a rectangular assembly. A snap-in structure 32 fixedly attached to display module 13 extends into cut-out area 31, and aligns with and engages an engagement slot 33 in vertical portion 18 of mounting structure 17 when the display module is fully engaged.

FIG. 3C shows additional detail of snap-in structure 32 and engagement slot 33. Structure 32 is injection molded plastic in the embodiment shown, and includes a cantilevered spring-lever 34 with a snap-in shoulder 35. Slot 33 has a shoulder 36 which engages shoulder 35 on structure 32 when fully assembled, firmly locking display module 13 into structure 17. A spring-loaded button 37 is configured to deflect cantilever spring 34 when the button is depressed, allowing disjoining of the display module and the mounting structure.

There is additionally a connector 39 (FIG. 2) with a male (39') and a female (39") part (FIG. 3A), for communication, power, and control signals between the computer and display module 13.

To remove a display from the computer, one depresses button 37 and slides the display to the side (direction of arrow 23), disengaging snap-in structure 32 and connector 39, while at the same time disengaging the three sets of linearly operating guides mounted across the length of structure 17 and the display module When the linearly operating guides are disengaged, one may lift the display module away from the computer. To engage the same or another display module, one sets the module in alignment on structure 17 with the matched linear guides adjacent, then slides the module in the direction of arrow 23 to accomplish engagement. The purpose of having plural sets of engaging guides is to minimize the distance one must move the display module to one side when engaging ad disengaging.

The particular arrangement shown in FIGS. 2, 3A, 3B, and 3C has proven to be advantageous, although there are other arrangements also useful. One could, for example, use round pins aligned with bores to accomplish guiding and engaging. In the embodiment shown the height of portion 18 of structure 17 is about 6 cm., but could extend for the full height of module 13.

A distinct advantage of the sideways engagement and disengagement for the display module lies in the fact that the engaging guides, such as guides 25 and 26, may be easily moved in the engagement direction, but are extremely difficult to separate at a right angle to the engaging direction. The same is true for other engaging devices that might be used, such as pins as mentioned above. One may pick the assembly up by the display module and carry it that way, because the forces from doing so will be at a right angle to the length of the engagement elements, instead of in line with the direction of disengagement. This is a particular advantage for the notebook computer.

In the embodiment shown power and control connection is made from the computer to display module 13 through the multi-pin electrical connector 39 (FIG. 2), shown as male part 39' and female part 39" in FIG. 3. In the present embodiment there are 40 pins in the connector, although in some other embodiments there might be more or fewer.

As described above, the removable nature of the display module makes it possible to provide a variety of display modules to be used with a single notebook computer. A user may then be offered a number of purchase options. One might desire, for example, to have two display modules, one capable of providing optimum performance under office conditions, and another for outdoor use. The replaceable nature of the display module also allows a user to update to higher performance (and perhaps more expensive) displays at a time after purchase. One also has the option of interfacing displays to the computer that may be developed at a later time.

An additional feature of the invention is an ability on power-up to ascertain the nature of the display module and to provide the correct power and control signals for the assembled module.

Figure 4:
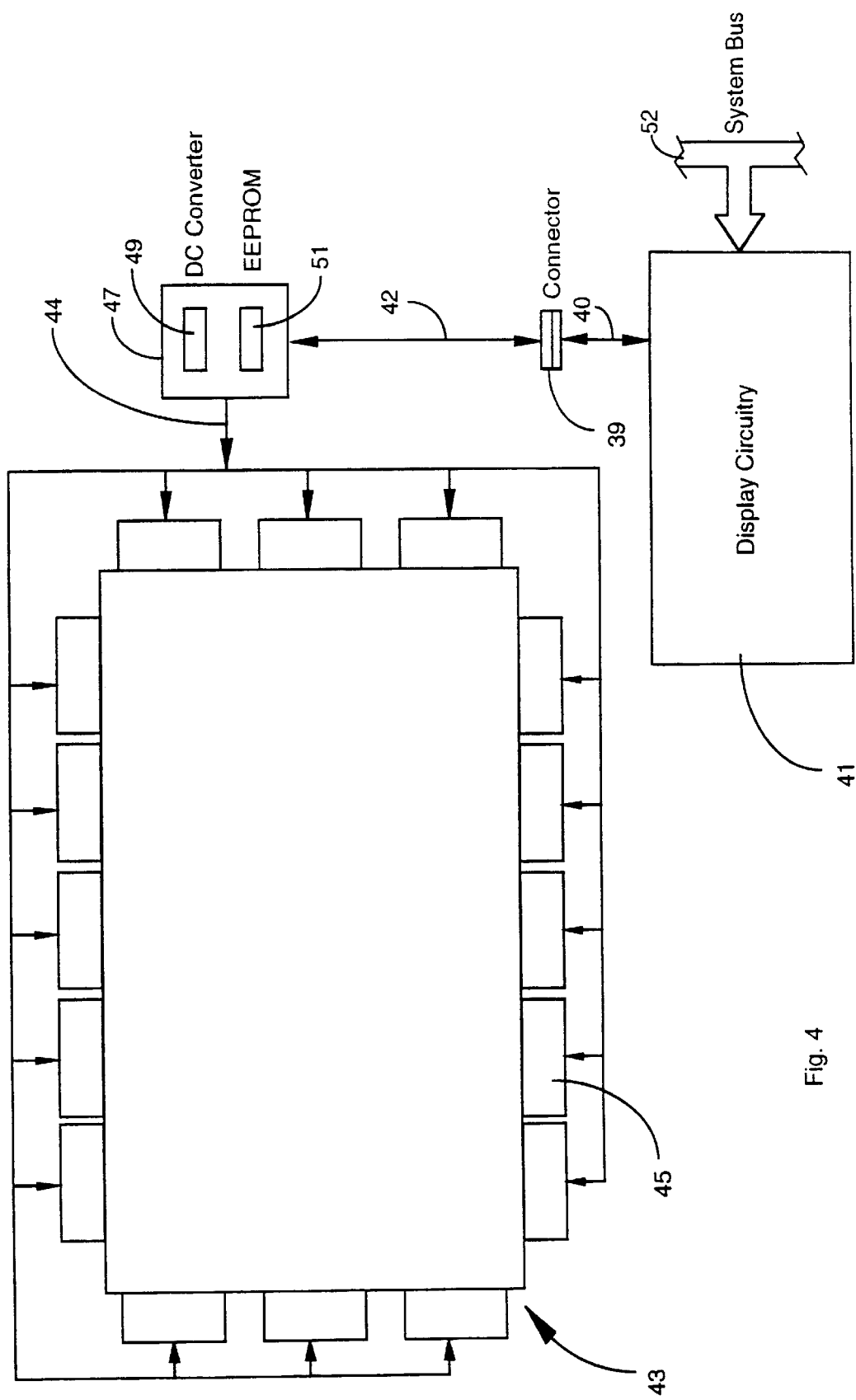
FIG. 4 is a block diagram depicting an arrangement of elements of a computer according to an embodiment of the invention, used for initializing the computer to operate the modular display.
Figure 5:
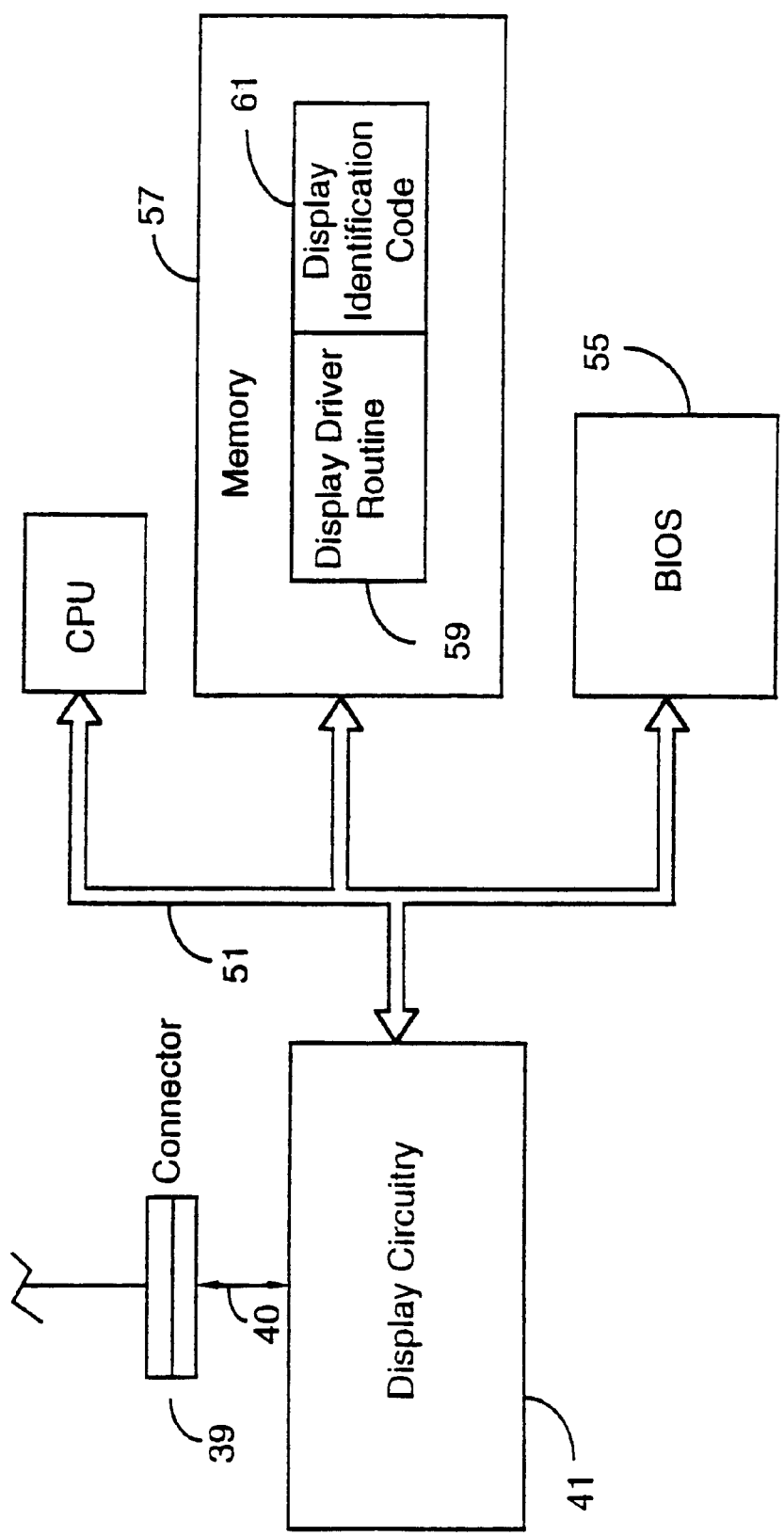
FIG. 5 is a block diagram of elements of a portable computer connected to the elements of FIG. 4.
Figure 6:
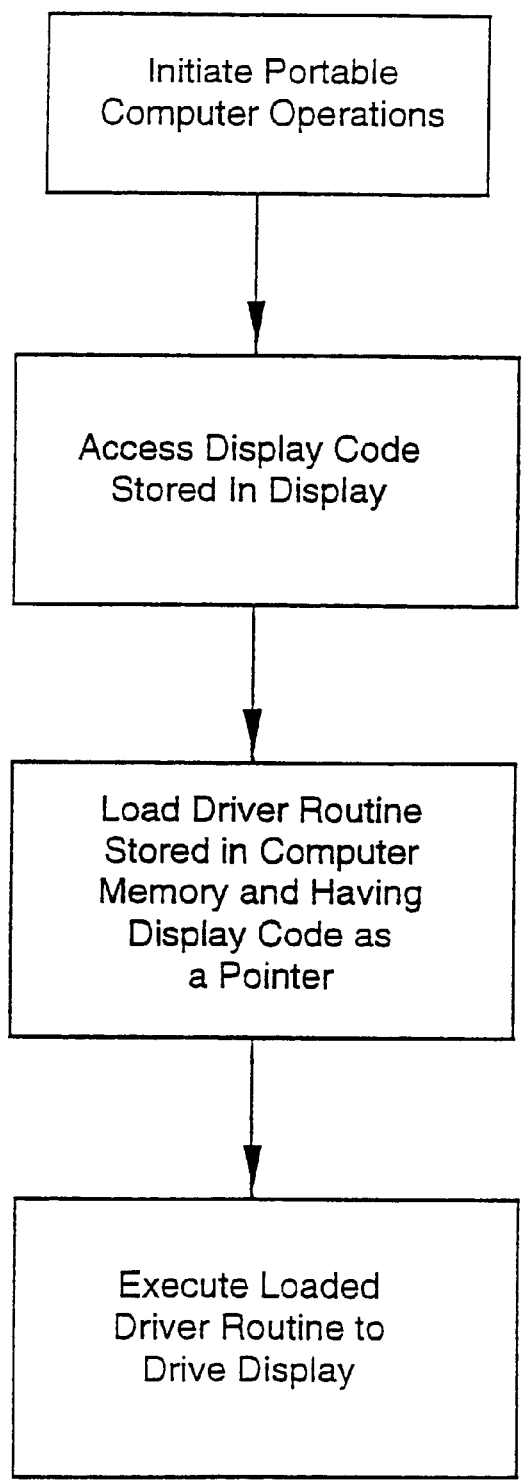
FIG. 6 is a logic flow diagram depicting steps of a method according to an embodiment of the present invention.

FIG. 4 is a block diagram showing the connection of power and control elements in an embodiment of the invention. In this embodiment a display board 41 is incorporated into the computer with connection to the system parallel bus 52, and having output to 40-pin connector 39 along path 40. Display module 13 comprises a flat panel display 43, which, in this embodiment is a component obtained from one of several suppliers of flat panel displays. As is typical in the industry, display 43 comprises "tabs" such as tab 45, which incorporate logic for converting data communication to on-off status for crossed traces that activate bits in the bit-array of the display. In this embodiment the display emulates to 640 column by 480 line standard of VGA displays. Displays in the art come complete with wiring connections and signal requirements, including data format and so forth, so the computer manufacturer using the display may provide the correct operating signals.

The display module also comprises circuitry 47, including an adjustable DC/DC converter 49 and a EEPROM memory device 51 for storing a code associated with the type display with which the EEPROM is associated. Circuitry 47 is connected to connector 39 by path 42, and provides output to display 43 via path 44. The DC/DC converter receives a power trace through the connector, and provides output for contrast voltage and backlighting, which may be adjusted via user signals. This output is part of the signals on path 44 to display 43. In one variation, the contrast and brightness are adjustable by keystroke combinations, and in a more preferred mode, when a pointing device (such as a mouse) is used, the contrast and brightness may be adjusted by movement of the pointing device. In both variations, the adjustments are software controlled. There may also be input devices, such as familiar slide switches, on the display module to make such adjustments.

In the present embodiment EEPROM 51 is programmed with a unique identity code for the specific type of module. Each type of module offered for the computer has a specific identity code. On initializing, the system BIOS queries the display to ascertain the module type, and loads the correct routines to operate that module. For the situation where a new type or improved display module is introduced, a simple BIOS upgrade allows previously manufactured computers to use the new display module.

Typically communication to the display module to control the bit-map of the display is by 8-bit serial data flow. The protocol for the serial communication, however, is not always the same from manufacturer to manufacturer and for different display types. Hence the EEPROM code for identity, which the computer system uses as a pointer to driver routines to match the particular requirement of the display module. On power-up, as indicated above, the BIOS queries the display module and loads the correct display driver routines.

As a further aid in understanding the circuitry for the present embodiment of the invention, Table I is provided with the present pin number assignments related to signal identification.

TABLE I

Pin Assignments

| No. | Pin | Description |
|---|---|---|
| 1 | VCC | Power to display logic |
| 2 | VSS | Ground to display logic |
| 3 | VEN | Unused |
| 4 | VEP | Unused |
| 5 | SDE | Serial I/O to EEPROM |
| 6 | SD1 | Serial I/O to EEPROM |
| 7 | SD2 | Serial I/O to EEPROM |
| 8 | CF1 | Contrast control (analog) |
| 9 | CF2 | Brightness control (analog) |
| 10 | CF3 | Unused |
| 11 | CF4 | Unused |
| 12 | DEN | Display enable |
| 13 | FCL | Frame clock |
| 14 | PCL | Pixel clock |
| 15 | RCL | Row clock |
| 16 | ACL | Modulation |

TABLE I-continued

Pin Assignments

| No. | Pin | Description |
|---|---|---|
| 17 | UD0 | Upper display data 0 |
| 18 | UD1 | Upper display data 1 |
| 19 | UD2 | Upper display data 2 |
| 20 | UD3 | Upper display data 3 |
| 21 | UD4 | Upper display data 4 |
| 22 | UD5 | Upper display data 5 |
| 23 | UD6 | Upper display data 6 |
| 24 | UD7 | Upper display data 7 |
| 25 | LD0 | Lower display data 0 |
| 26 | LD1 | Lower display data 1 |
| 27 | LD2 | Lower display data 2 |
| 28 | LD3 | Lower display data 3 |
| 29 | LD4 | Lower display data 4 |
| 30 | LD5 | Lower display data 5 |
| 31 | LD6 | Lower display data 6 |
| 32 | LD7 | Lower display data 7 |
| 33 | RB | Raw battery plus |
| 34 | RB | Raw battery plus |
| 35 | RB | Raw battery plus |
| 36 | RB | Raw battery plus |
| 37 | RBGND | Raw battery ground |
| 38 | RBGND | Raw battery ground |
| 39 | RBGND | Raw battery ground |
| 40 | RBGND | Raw battery ground |

In this particular instance, there are two bit streams, one for an upper display, and the other for a lower display, which are not separate displays at all, but upper and lower segments of the one display, driven in parallel to avoid flicker. The 40-pin arrangement has proven to also be sufficient to drive color displays, which have, generally speaking, three times the dots in the display map as do monochrome displays.

There are many changes that may be made in the embodiments of the invention described above without departing from the spirit and scope of the invention. For example, there are several ways the circuitry might be arranged to accomplish the task of querying the EEPROM in the display module to determine the display type and drive requirements. Likewise, a EEPROM is convenient for storing the identity code at the display module, but is not the only memory device that might be used. There are also a number of alternative arrangements of elements to allow display modules to engage from one side, as described above. There are similarly many other alterations that may be made without departing from the spirit and scope of the invention.

What is claimed is:

1. A general-purpose computer comprising:
a computer body structure that houses and supports circuitry of said computer, said computer body structure including a mounting structure that guides and engages a removable flat panel display for attachment to said computer body structure;
a removable flat-panel display having a display screen and an engagement apparatus that is guided and engaged by said mounting structure so as to attach said flat panel display to said computer body structure; and
mating electrical connectors on said flat panel display and said computer body structure that, when connected, provide display control signals to said flat panel display from said circuitry housed by said computer body structure,
wherein said mounting structure includes a horizontal portion pivotally attached to said computer body structure along a pivot axis and a slidable engagement apparatus mounted to the horizontal portion that engages a corresponding slidable engagement apparatus of said engagement apparatus of said flat panel display in an engagement direction that is substantially parallel to the pivot axis, said mounting structure receiving and holding said flat panel display as a hinged unit closable over said computer body structure and openable to provide access to said display screen.

2. A computer as in claim 1, wherein said mounting structure includes one of round pins and aligned bores that engages said engagement apparatus of said flat panel display, said engagement apparatus including the other one of said round pins and aligned bores, whereby when said round pins and aligned bores are engaged, said mounting structure receives and holds said flat panel display as a hinged unit closable over said computer body structure and openable to provide access to said display screen.

3. A computer as in claim 1, wherein said mating electrical connectors comprise a first portion of a multi-pin electrical connector mounted in an edge of said flat panel display and a second portion of said multi-pin electrical connector mounted in a portion of said mounting structure so as to engage said first portion when said flat panel display is guided into position and engaged by said mounting structure.

4. A computer as in claim 1, wherein said mounting structure includes one of a snap-in flange and an engagement slot and said engagement apparatus of said flat panel display includes the other of said snap-in flange and said engagement slot, said snap-in flange and engagement slot being configured to engage and snap together as said flat panel display and said mounting structure fully engage, thereby holding said flat panel display firmly in engagement with said mounting structure of said computer body structure.

5. A computer as in claim 4, further comprising a release button that releases said snap-in flange from said engagement slot so as to release said flat panel display from said mounting structure for removal.

6. A computer as in claim 1, wherein said flat panel display includes a non-volatile memory device containing a unique identity code unique to the specific type of flat panel display and said circuitry of said computer provides data and command signals to the flat panel display through said mating electrical connectors, said command signals including a command to return a code stored in said non-volatile memory of said flat panel display, said circuitry further selecting a driver routine associated with the code stored in the non-volatile memory for operation of said flat panel display.

7. A computer as in claim 1, wherein said engagement apparatus mounted to the horizontal portion comprises at least one engagement rail configured to engage a corresponding rail in said counterpart engagement apparatus of said flat panel display.

8. A flat panel display module for a computer, comprising:
a display screen on a side of said display module that displays output of said computer;
an engagement apparatus on at least one edge of said display module that joins said display module to said computer; and
an electrical connector on a side of said display module that electrically connects said display module to said computer,
wherein said engagement apparatus is configured to engage a counterpart engagement apparatus on said computer whereby said display screen is attached to said computer so as to pivot from an open position for viewing to a closed position over a body structure of the computer, and
wherein said engagement apparatus of said display module includes a slidable engagement apparatus and said counterpart engagement apparatus of said computer includes a mounting structure that includes a horizontal portion pivotally attached to the computer body structure of said computer along a pivot axis and a slidable engagement apparatus mounted to the horizontal portion that engages said slidable engagement apparatus of said flat panel display module in an engagement direction that is substantially parallel to the pivot axis, said respective slidable engagement apparatuses receiving and holding said flat panel display module as a hinged unit closable over said computer body structure of said computer and openable to provide access to said display screen.

9. A display module as in claim 8, wherein said engagement apparatus of said display module includes one of round pins and aligned bores that engages said counterpart engagement apparatus of said computer including the other one of said round pins and aligned bores, whereby when said round pins and aligned bores are engaged, said respective engagement apparatuses receive and hold said flat panel display module as a hinged unit closable over said computer body structure of said computer and openable to provide access to said display screen.

10. A display module as in claim 8, wherein said electrical connector comprises a first portion of a multi-pin electrical connector mounted in an edge of said flat panel display, said electrical connector cooperating with an electrical connector on said computer body structure comprising a second portion of said multi-pin electrical connector, said first and second portions engaging when said flat panel display module is guided into position and engaged by said engagement apparatus and counterpart engagement apparatus.

11. A display module as in claim 8, wherein said counterpart engagement apparatus of said computer includes one of a snap-in flange and an engagement slot and said engagement apparatus of said flat panel display module includes the other of said snap-in flange and said engagement slot, said snap-in flange and engagement slot being configured to engage and snap together as said engagement apparatus of said flat panel display module and said counterpart engagement apparatus fully engage, thereby holding said flat panel display firmly in engagement with said computer body structure.

12. A display module as in claim 8, wherein said engagement apparatus of said display module comprises at least one engagement rail configured to engage a corresponding rail in said counterpart engagement apparatus of said computer.

13. A display module as in claim 8, further comprising a non-volatile memory device containing a unique identity code unique to the specific type of flat panel display module and circuitry responsive to data and command signals from the computer to return the unique identity code stored in said non-volatile memory.

14. A general-purpose computer comprising:
a computer body structure that houses and supports circuitry of said computer, said computer body structure including a mounting structure that guides and engages a removable flat panel display for attachment to said computer body structure; and
an electrical connector on said computer body structure that, when connected to a mating electrical connector on said removable flat panel display, provides display control signals to said flat panel display from said circuitry housed by said computer body structure, wherein said mounting structure includes a horizontal portion pivotally attached to said computer body structure along a pivot axis and a slidable engagement apparatus mounted to the horizontal portion that engages a corresponding slidable engagement apparatus of said removable flat panel display in an engagement direction that is substantially parallel to the pivot axis, said mounting structure receiving and holding said removable flat panel display as a hinged unit closable over said computer body structure and openable to provide access to a display screen of said removable flat panel display.

15. A computer as in claim 14, wherein said mounting structure includes one of round pins and aligned bores that engages a counterpart engagement apparatus of said removable flat panel display, whereby when said round pins and aligned bores of said mounting structure and counterpart engagement apparatus are engaged, said mounting structure receives and holds said removable flat panel display as a hinged unit closable over said computer body structure and openable to provide access to a display screen of said removable flat panel display.

16. A computer as in claim 14, wherein said electrical connector comprises a first portion of a multi-pin electrical connector mounted in said mounting structure, said electrical connector cooperating with an electrical connector on said removable flat panel display comprising a second portion of said multi-pin electrical connector, said first and second portions engaging when said removable flat panel display is guided into position and engaged by said mounting structure.

17. A computer as in claim 14, wherein said mounting structure includes one of a snap-in flange and an engagement slot and an engagement apparatus of said removable flat panel display includes the other of said snap-in flange and said engagement slot, said snap-in flange and engagement slot being configured to engage and snap together as said removable flat panel display and said mounting structure fully engage, thereby holding said removable flat panel display firmly in engagement with said mounting structure of said computer body structure.

18. A computer as in claim 17, further comprising a release button that releases said snap-in flange from said engagement slot so as to release said removable flat panel display from said mounting structure for removal.

19. A computer as in claim 14, wherein said circuitry of said computer requests from a connected removable flat panel display a unique identity code unique to the specific type of removable flat panel display and provides data and command signals to the removable flat panel display through said electrical connector, said circuitry further selecting a driver routine associated with the code stored in the non-volatile memory for operation of said removable flat panel display.

20. A computer as in claim 14, wherein said engagement apparatus mounted to the horizontal portion comprises at least one engagement rail configured to engage a corresponding rail in said counterpart engagement apparatus of said flat panel display.

* * * * *